(12) United States Patent
Banerjee

(10) Patent No.: US 8,640,190 B1
(45) Date of Patent: Jan. 28, 2014

(54) PARENTAL CONTROL POLICY GENERATION

(75) Inventor: Anindya Banerjee, Barrackpore (IN)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 13/369,852

(22) Filed: Feb. 9, 2012

(51) Int. Cl.
*G06F 17/00* (2006.01)

(52) U.S. Cl.
USPC .......... 726/1; 726/2; 726/17; 726/27; 726/21; 713/182; 707/722

(58) Field of Classification Search
USPC ........ 726/1, 25, 27, 2, 22; 713/166, 182, 150; 455/410
See application file for complete search history.

(56) References Cited

U.S. PATENT DOCUMENTS

| | | | |
|---|---|---|---|
| 7,472,424 B2* | 12/2008 | Evans et al. | 726/27 |
| 8,090,659 B2* | 1/2012 | Risan et al. | 705/51 |
| 8,091,141 B2* | 1/2012 | Evans et al. | 726/27 |
| 8,205,240 B2* | 6/2012 | Ansari et al. | 726/1 |
| 8,302,208 B1* | 10/2012 | Feeser et al. | 726/27 |
| 2004/0139043 A1* | 7/2004 | Lei et al. | 707/1 |
| 2005/0081043 A1* | 4/2005 | Evans et al. | 713/182 |
| 2007/0180519 A1* | 8/2007 | Boccon-Gibod et al. | 726/21 |
| 2010/0235907 A1* | 9/2010 | Bowman et al. | 726/21 |
| 2010/0235923 A1* | 9/2010 | Schepis et al. | 726/26 |
| 2011/0321122 A1* | 12/2011 | Mwangi et al. | 726/1 |
| 2012/0084349 A1* | 4/2012 | Lee et al. | 709/203 |
| 2012/0216300 A1* | 8/2012 | Vivolo et al. | 726/30 |
| 2013/0031601 A1* | 1/2013 | Bott | 726/1 |
| 2013/0031638 A1* | 1/2013 | Appelman et al. | 726/27 |
| 2013/0040629 A1* | 2/2013 | Sprigg et al. | 455/419 |

OTHER PUBLICATIONS

Qun Ni, Privacy-aware role based access control, ACM, vol. 13, Jul. 2010, pp. 8-11.*

* cited by examiner

*Primary Examiner* — Nathan Flynn
*Assistant Examiner* — Viral Lakhia
(74) *Attorney, Agent, or Firm* — Campbell Stephenson LLP

(57) ABSTRACT

Various systems and methods generate access control policies. For example, one method can receive attribute information regarding a computer user. The method can compare the attribute information with access control information and select a value of an access restriction based on a result of the comparing. The access restriction indicates whether a computer resource can be accessed or not. The method then generates an access control policy that includes the value of the access restriction.

20 Claims, 9 Drawing Sheets

|        | Restriction 1 |             | Restriction 2 |             | ••• | Restriction N |
|--------|---------------|-------------|---------------|-------------|-----|---------------|
|        | Parameter 1   | Parameter 2 | Parameter 1   | Parameter 2 | ••• | Parameter 1   |
| User 1 | 2pm           | 4pm         | 2pm           | 4pm         | ••• | 3Mb           |
| User 2 | 6pm           | 8pm         | --            | --          | ••• | 10Mb          |
| User 3 | --            | --          | --            | --          | ••• | --            |
| ⋮      | ⋮             | ⋮           | ⋮             | ⋮           | ••• | ⋮             |
| User N | 12pm          | 7pm         | 12pm          | 7pm         | ••• | 1Mb           |

PARENTAL CONTROL POLICY GENERATION

FIELD OF THE INVENTION

This invention relates to digital content, and particularly to parental monitoring and control of access to digital content.

BACKGROUND OF THE INVENTION

The increasing ease with which content can be created or captured and stored on a computer, coupled with the proliferation of network access has led to ready access to a vast amount and variety of digital content. The Internet, in particular, facilitates increased availability of all manner of content sharing and interactions between computer users. Parents wishing to protect their children from unsafe and/or inappropriate content and activities can employ parental control software to do so.

Installing and configuring parental control software can be a time consuming and frustrating process. Inexperience in configuring parental control software can lead to ineffective control. If not properly configured, parental control software may fail to prevent access to objectionable content and activities, or may fail to permit access to content and activities that are not objectionable. However, the only way to gain experience in effectively configuring parental control software is often through a time consuming process of trial and error. A mechanism to more effectively and efficiently configure parental control software is desirable.

BRIEF DESCRIPTION OF THE DRAWINGS

The present invention may be better understood, and its numerous objects, features and advantages made apparent to those skilled in the art by referencing the accompanying drawings.

Figure 1:
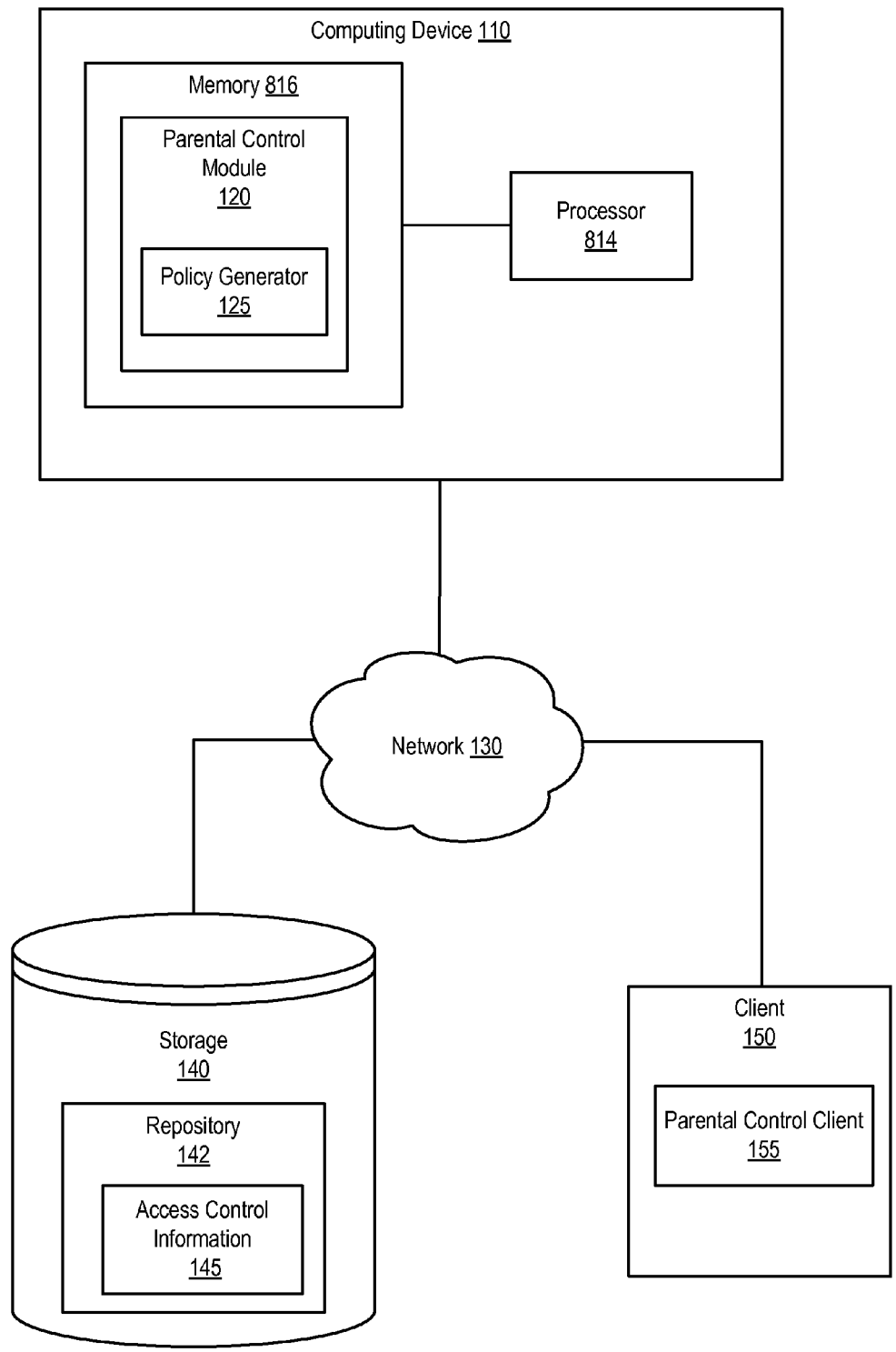
FIG. 1 is a simplified block diagram illustrating an example of a system that generates parental control policies, in accord with embodiments of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

An access control policy specifies conditions under which particular computer-related activities are permitted or prohibited. Access control policies can be employed in a variety of settings, such as home or business. An access control policy for the home is referred to herein as a parental control policy. An access control for a business is referred to as a productivity protection policy. A variety of computer related tasks can be controlled using an access control policy, such as a parental control policy. For example, a parental control policy can specify that certain web sites, or web sites that display certain types of content, are not accessible from one or more computers, are accessible only at certain times, and/or are accessible only by certain users. A parental control policy can also restrict activities such as file uploads and/or downloads and Internet chat activities. For example, a parental control policy can specify file types that are allowed to be uploaded and/or downloaded as well as file types that are prohibited from being uploaded and/or downloaded. A parental control policy can also specify size restrictions that determine whether a file or file type can be uploaded or downloaded. An example parental control policy can specify that a user can chat with other users only if the other users are included in a list of approved users, such as a friend list.

Given the large number of parameters available, configuring an access control policy can be a time consuming task. One way to configure a new access control policy is to use existing access control policies as a template for the new access control policy. This involves populating fields of the new access control policy with values from one or more existing access control policies.

FIG. 1 is a simplified block diagram illustrating, in terms of parental control policies, an example of a system that generates and maintains parental control policies. As shown, the system includes computing device 110 coupled to storage 140 and client 150 via network 130. Network 130 can include, for example, a WAN (Wide Area Network), such as the Internet, one or more LANs (Local Area Networks), and/or one or more SANs (Storage Area Networks). Embodiments of the present invention are not limited by the type or protocols of communication for network 130.

Computing device 110 is a computing device such as a personal computer, laptop computer, server, personal digital assistant, cell phone, or the like. Computing device 110 includes at least one processor 814 and a memory 816.

Client 150 is a computing device such as a personal computer, laptop computer, server, personal digital assistant, cell phone, or the like. Client 150 implements parental control client 155. Parental control client 155, in conjunction with parental control module 120 and access control information 145, forms a parental control system.

Storage 140 provides persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Memory 816 stores program instructions executable by processor 814 to implement a parental control module 120, which includes a policy generator 125. Parental control module 120 accesses access control information 145 in repository 140. Such access includes reading access control information 145 and writing additional information to access control information 145. Policy generator 125 uses access control information 145 to generate parental control policies.

Access control information 145 includes a number of parental control policies and information related to parental control policies. The parental control policies specify restrictions on access to computer related information and activities. Restrictions can include, for example, parameters defining how, when, or by whom a computer related activity can be performed. Such activities can include accessing Internet web sites, chat rooms, downloading and uploading content, and the like. A restriction includes one or more values for each parameter associated with the restriction. The values identify the manner in which the given activity can be performed, and/or specify the manner in which the given activity is prohibited. For example, a restriction entitled 'Web Sites' can include the parameter 'Type of Site'. A value of the parameter 'Type of Site' can specify 'Entertainment-Oriented Web Sites'. The parental control policy can include a list of sites that fall under the value 'Entertainment-Oriented Web Sites'. The parental control policy can include the parameter 'Restricted Users' and 'Permitted Time'. The restriction can also include associated values for these parameters. For example, the parameter 'Restricted Users' can include the value 'User 1'. This indicates that User 1 is a restricted user. The parameter 'Permitted Time' can include the values '2 pm' and '4 pm'. These values indicate that User 1 is prohibited access to entertainment-oriented web sites at all times except during the permitted time interval between the hours of 2 pm and 4 pm. The restriction on access to entertainment-oriented website can also include values that specify that another user, e.g., 'User 3', is permitted to access entertainment-oriented web sites at all times. In this example, 'User 1', 'User 2', '2 pm', '4 pm', and 'At All Times' are each values associated with the parameters of the restriction on access to specified web sites, e.g., entertainment-oriented web sites.

Parental control module 120 can classify web sites based on content of the websites, such as tags, or can receive a list of web sites and web site classifications, e.g., from an organization that rates and/or classifies content on the Internet. For example, information regarding the appropriateness and safety of Internet content and activities can be obtained from an organization such as the Entertainment Software Ratings Board, or from numerous other sources, such as ratings web sites or virus web sites. Information classifying Internet resources, such as web sites, can be stored in access control information 145. Policy generator 125 can decide which restrictions should be included in a given policy, as described below, and create a parental control policy including those restrictions. The parental control policy can also include a list identifying which content and/or activities the restrictions apply to.

Parental control policies in access control information 145 can include existing parental control policies set up by users of parental control software as well, default parental control policies, e.g., parental control policies configured by parental control software developers and/or parental control policies automatically generated by parental control module 120, and rating information from third party sources. Access control information 145 can contain parental control policies collected from any number of users. The parental control policies can thus number in the many thousands, or more, and can be collected from users with a broad spectrum of demographic characteristics and control requirements. Access control information 145 forms a global repository from which parental control policy templates can be generalized effectively.

While the system of FIG. 1 shows a single repository containing all access control information, the system is not limited to a single repository. In an embodiment, access control information 145 can be distributed among multiple repositories. Access control information 145 can also be grouped, or divided, based on locations from which access control information 145 is obtained. In an embodiment, rather than a single global repository 142, multiple repositories can exist. Repositories can be created, e.g., by parental control module 120, for multiple regions, countries, or other geographic, legal, and/or cultural divisions. For example, a repository can be established based on standards or laws of a particular jurisdiction. While a certain type of activity (e.g., downloading a certain type of content) may be permitted under one country's laws, such activity may be prohibited under another country's laws. In response to detecting a difference between jurisdictions, parental control module 120 can establish separate repositories for the differing jurisdictions.

Information related to parental control policies, as found in access control information 145, includes statistics related to the use of parental control policies. For example, the statistics can identify which types of restrictions are included in which parental control policies, and how effective the restrictions are. The information can be generated automatically, e.g., by monitoring a parental control policy after the parental control policy is activated on client 150. Alternatively, the information can be generated based upon user feedback. For example, a user of client 150 can transmit feedback to policy control module 120 indicating how effective a particular restriction is. Policy control module 120 can store transmit the feedback to repository 140, which stores the feedback in access control information 145. Based on the information in these repositories, parental control module 120 can generate policies more effectively targeted for particular regions or jurisdictions.

A restriction is considered effective if the restriction prevents the activity the restriction is intended to prevent and does not prevent activities the restriction is not intended to prevent. Parental control module 120 can determine the effectiveness of a restriction by comparing the number of successful preventions (e.g., preventions that were intended) with the number of unsuccessful preventions (e.g., failures to prevent an activity the restriction was intended to prevent or prevention of an activity the restriction was not intended to prevent). Parental control module 120 can measure a restriction's effectiveness by calculating a percentage of successful to unsuccessful preventions. Parental control module 120 can rate a parental control policy's effectiveness based upon the effectiveness of the restrictions included in the parental control policy. The rating of the effectiveness of each restriction in a parental control policy can be combined, e.g., using a weighted average, to calculate the effectiveness of the parental control policy. Rating the effectiveness of restrictions and parental control policies allows parental control policy generator 125 to improve the effectiveness of generated parental control policies over time. That is, policy generator 125 can select restrictions to include in a parental control policy based on the effectiveness of the restrictions. Policy generator 125 can select restrictions with higher ratings rather than those with lower ratings to be included in a parental control policy. This improves the likelihood that policy generator 125 will generate effective parental control policies. Parental control module 120 can update the effectiveness ratings of restrictions as additional effectiveness information is received, e.g., from parental control client 155, and generate more effective parental control policies that include more effective restrictions.

Parental control module 120 provides various services to parental control client 155 executing on client 150 so that parental control client 155 can effectively implement a parental control policy. Client 150 can be a standard computer, such as a laptop or desktop, a mobile device, such as a tablet or smart phone, or any other type of computing device. Thus, the type of activity a parental control policy is directed to control may vary based on the types of tasks commonly performed by the parental control client. For example, a parental control policy implemented by a mobile device can include additional restrictions for text messaging since text messaging is an activity more commonly conducted via a mobile device. Parental control client 155 can provide information regarding the type of device to parental control client 120, or parental control client 120 can detect the type of device and modify which restrictions are selected for a parental control policy based on the type of device that will implement the parental control policy.

Policy generator 125, in response to receiving a request from parental control client 155, can generate a parental control policy and transmit the parental control policy to parental control client 155. Parental control client 155 is configured to monitor activities performed using client 150, such as browsing the Internet, chatting online, instant messaging, and uploading and downloading files, and restrict or permit those activities in accord with a parental control policy. Parental control client 155 can receive a parental control policy generated by policy generator 125 and apply the restrictions included in the parental control policy to activities performed by client 150. The activities performed by client 150 can include activities performed by a user of client 150 as well as activities automatically performed by client 150, such as automatic updates, cookie storage, preference modifications, and the like. Parental control client 155 can also generate and transmit feedback messages to parental control module 120. Parental control client 155 can include in the feedback messages information indicating changes to a parental control policy as well as information indicating the effectiveness of a parental control policy. Parental control client 155 can also transmit information indicating demographic characteristics of users of client 150 as well as changes to those demographic characteristics already transmitted to parental control module 120.

Using access control information 145 and information about the characteristics and parental control criteria of users of client 150, policy generator 125 of parental control module 120 is configured to generate a parental control policy and transmit the parental control policy to client 150. Policy generator 125 can compare the information received from parental control client 155, such as the demographic information of users of client 150, with information in access control information 145 about existing parental control policies in access control information 145. Based on the comparison, policy generator 125 can select one or more parental control policies that are used for similar users. Policy generator 125 can also sort multiple selected parental control policies based on the effectiveness of each parental control policy and can then use effectiveness as an additional criteria in selecting a policy for parental control client 155. Policy generator 125 can select restrictions from multiple different parental control policies and combine the restrictions to generate a new parental control policy for parental control client 155. Alternatively, policy generator 125 can select an existing parental control policy from the parental control policies in access control information 145. Once policy generator 125 has selected or created a parental control policy for parental control client 155, policy control module 120 can transmit the parental control policy to parental control client 155.

Parental control module 120 can detect that parental control client 155 should receive a new parental control policy. The detection can involve detecting that parental control client 155 is newly installed, updated, or that a parental control policy currently used by parental control client is ineffective. Detecting that parental control client 155 should receive a new parental control policy can also involve detecting changes in user demographics, such as additional users, or changing characteristics, such as age, of existing users. For example, as a child grows older, the restrictions considered appropriate for the child may change. The parental control module can detect that the age of a user has changed. In response to this detection, policy generator 125 can locate a parental control policy that was previously created for the user. Policy generator 125 can then modify the parental control policy by removing restrictions, adding restrictions, and/or modifying parameter values for restrictions. Once the parental control policy has been modified, parental control module 120 can transmit the parental control policy to client 150, where parental control client 155 can implement the parental control policy.

Parental control module 120 can monitor the effectiveness of a parental control policy implemented by parental control client 155. If parental control module 120 detects that the effectiveness is below a predefined threshold, parental control module 120 can generate a new parental control policy and transmit the new parental control policy to client 150. In response to receiving the new parental control policy, parental control client 155 implements the new parental control policy. This can involve deactivating the old parental control policy and activating the new parental control policy. Alternatively, parental control client 155 can update the old parental control policy. This involves modifying restrictions in the old parental control policy, adding new restrictions to the old parental control policy, and/or removing restrictions from the old parental control policy. Modifying a restriction in a parental control policy involves adding, removing, or modifying one or more values in the parental control policy.

Policy generator 125 can detect a change in effectiveness statistics regarding one or more parental control policies in access control information 145. In response to detecting the change in effectiveness, policy generator 125 can detect that a change should be made to a parental control policy implemented by parental control client 155. Parental control module 120 can transmit a message indicating the needed change to parental control client 155. In response to receiving the message form parental control module 120, parental control client 155 can implement the change. For example, the message can indicate that parental control client 155 should add a new user to a restriction. Subsequent to this modification, the restriction applies to the new user. Additional examples of modifying a restriction include changing the value of time (e.g., when an activity is prohibited) and changing which activities are prohibited (e.g., adding a specific web site to a list of prohibited web sites).

Parental control module 120 can also detect that a new parental control policy should be implemented by parental control client in response to detecting new or changed user information for a user or users of client 150. For example, parental control client 155 can transmit a request to parental control module 120. The request specifies that policy generator 125 should generate a new parental control policy and transmit the parental control policy to parental control client 155. The request can include information about a user or users of client 150. For example, the request can identify demographic characteristics of a user of client 150, such as the user's age, gender, geographic location, organizational affiliations, and the like. The request can also include user information for multiple users of client 150, and can specify that policy generator 125 should generate multiple parental control policies, e.g., a separate parental control policy for each of the multiple users.

Figures 2A, 2B:
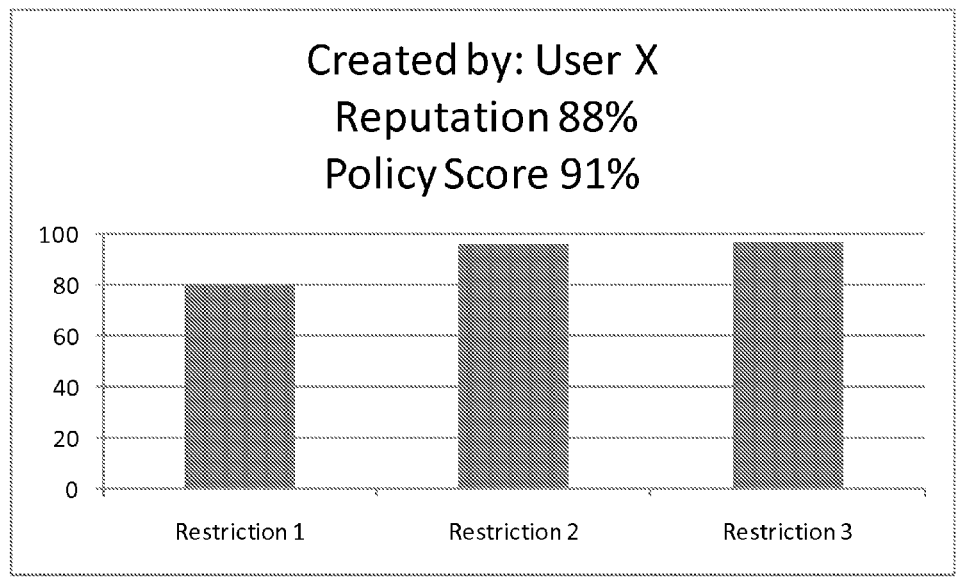
FIG. 2A is a table illustrating elements of an access control policy, according to one embodiment of the present invention.
FIG. 2B illustrates effectiveness data for an access control policy, according to one embodiment of the present invention.

FIG. 2A is a table illustrating elements of an access control policy. The table shown in FIG. 2A can be included in access control information, such as access control information 145 of FIG. 1. FIG. 2A shows a number of restrictions 1 through N. The restrictions can apply to any activity that can be performed using a computer. When an access control policy is implemented that includes the restrictions, the restrictions can limit how the activity can be performed.

It will be noted that the variable identifier "N" is used to more simply designate the final element of a series of related or similar elements (e.g., restrictions). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

For each restriction shown in FIG. 2A, there are a number of parameters. A 'Parameter 1' and 'Parameter 2' are associated with 'Restriction 1' and 'Restriction 2'. In an embodiment, Parameter 1' and 'Parameter 2' can indicate a start time and a stop time, respectively. For example, if 'Restriction 1' specifies an activity, such as viewing entertainment-oriented web sites, Parameter 1' and 'Parameter 2' for 'Restriction 1' can specify a time range in which this activity is permitted. That is, 'User 1' can view entertainment-oriented starting at 2 pm and ending at 4 pm. Before 2 pm and after 4 pm, viewing of entertainment-oriented websites by 'User 1' is not permitted. If 'User 1' tries to view an entertainment-oriented web site other than between 2 pm and 4 pm, an access control system employing a policy that includes 'Restriction 1'can take one or more possible actions. The system, e.g., a parental control client such as parental control client 155 of FIG. 1, can prevent access to the restricted web site. The parental control policy can control an Internet browser being accessed by a user and can prevent the browser from navigating to the requested restricted site. Instead, the parental control client can cause the browser to display a message indicating that the user is not permitted to access the site. The message can include information indicating that the site is accessible between 2 pm and 4 pm. The parental control client can also record information indicating that an attempt was made to perform a restricted activity. In an embodiment, the parental control client records that an attempt was made to perform a restricted activity, but still allows the restricted activity to be performed.

As seen in FIG. 2A, the number of parameters associated with a given restriction can vary. A given restriction can have one, two, or more parameters associated with the restriction. FIG. 2A also shows a number of users 1 through N. For each user, values can be specified. In some cases, a particular restriction is inapplicable to a user. In such a case, the parameter values for the inapplicable restriction can be left blank, or can be filled with a value that otherwise indicates that the restriction is inapplicable. For example, FIG. 2A shows that 'Restriction 1' applies to 'User 2', but 'Restriction 2' does not apply to 'User 2'. A policy generator, such as policy generator 125 of FIG. 1, can generate an access control policy, e.g., in response to a request for an access control policy from a parental control client. Generating the access control policy can involve selecting restrictions and parameter values for one or more users and creating a table of those restrictions and values, as shown in FIG. 2A.

FIG. 2B illustrates a graph of effectiveness data for an access control policy, according to one embodiment of the present invention. The data that forms the basis for the graph shown in FIG. 2B can be included in access control information, such as access control information 145 of FIG. 1, by a parental control module, such as parental control module 120 of FIG. 1. The parental control module can compile and organize effectiveness data. The effectiveness data can be received from, for example, a parental control client such as parental control client 155 of FIG. 1. As shown in FIG. 2B, 'Restriction 1' is 80% effective. The effectiveness can be measured and calculated by the parental control client and transmitted to the parental control module. Alternatively, the effectiveness data can be measured by the parental control client and transmitted to the parental control module, which then calculates the effectiveness. As shown in FIG. 2B, 'Restriction 2' is 96% effective and 'Restriction 3' is 97% effective. In an embodiment, a parental control policy includes the three restrictions shown in FIG. 2B. The parental control module can calculate an average effectiveness of 91% for the parental control policy. In an embodiment, the parental control module can identify the creator of the policy as 'User X' and calculate a reputation score of 88% for 'User X'. This means that the parental control module determines that for one or more policies created by 'User X', the policies are 88% effective. The parental control module can calculate the policy and reputation values using a simple or weighted average.

Figure 3:
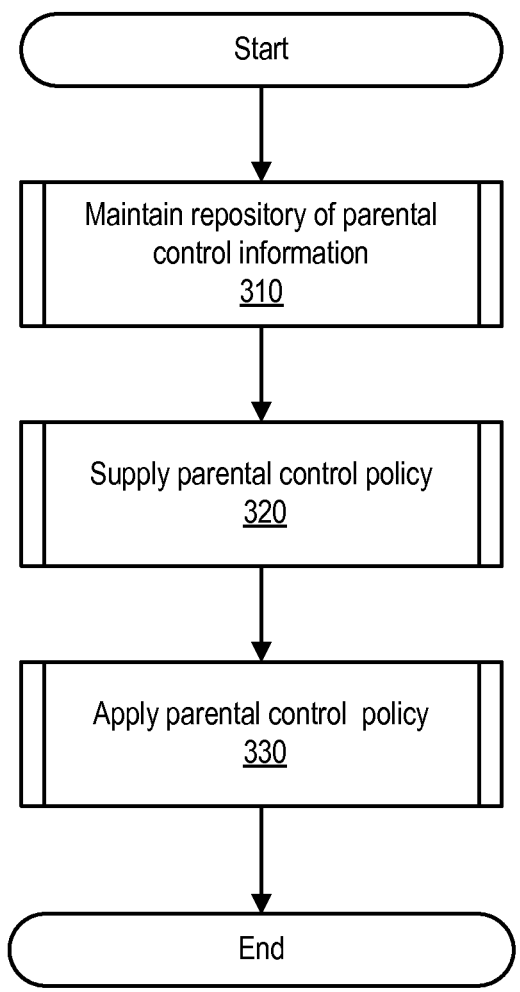
FIG. 3 is a flowchart of a method of operating of a parental control system, according to one embodiment of the present invention.

FIG. 3 is a flowchart of a method of operating of a parental control system. The method can be implemented by a computing device implementing a parental control module, such as computing device 110 of FIG. 1, which implements parental control module 120. In some embodiments, the computing device is coupled to a repository comprising policy information, such as repository 142 of FIG. 1 with access control information 145, and a client implementing a parental control client, such as client 150 of FIG. 1 which implements parental control client 155.

Figure 4:
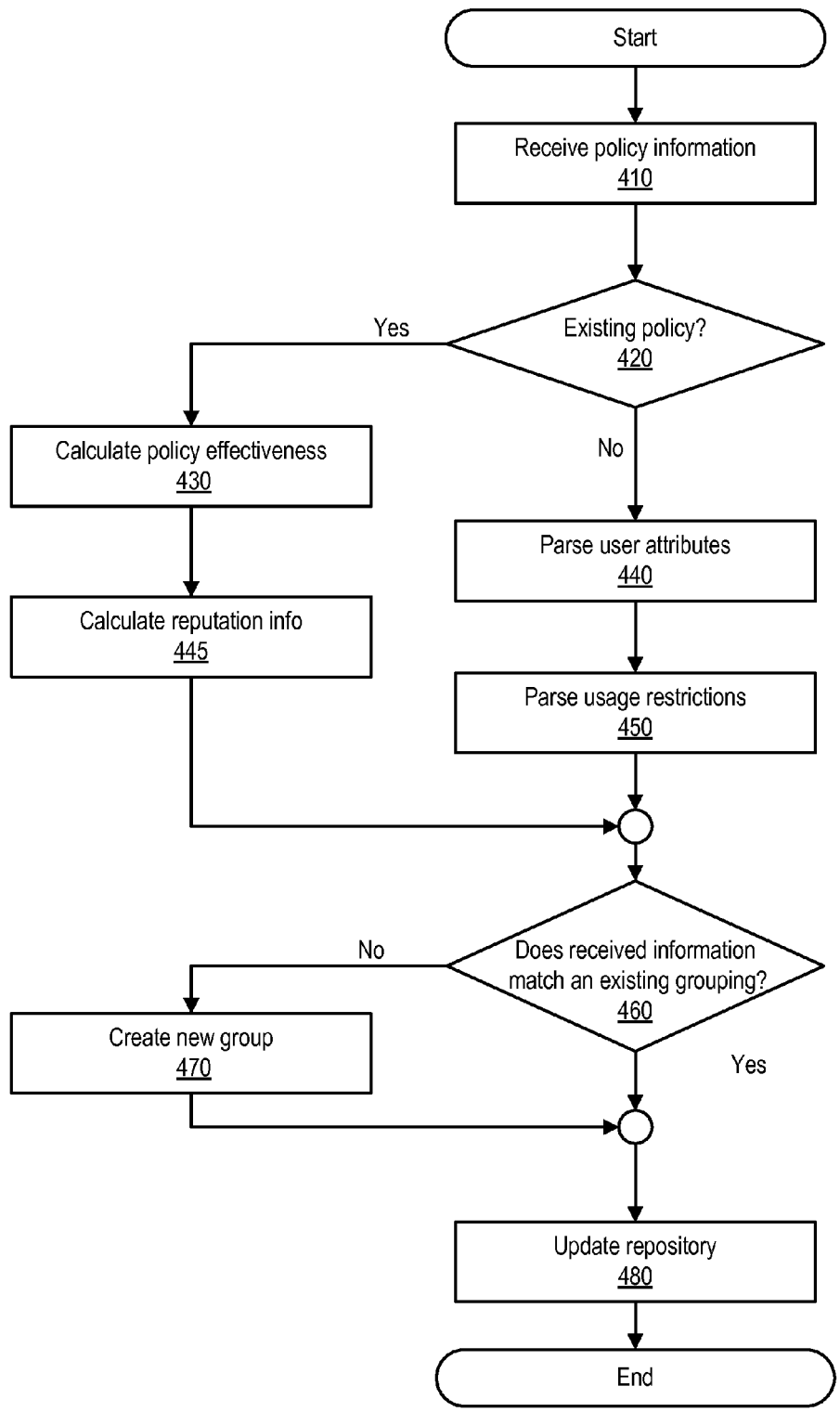
FIG. 4 is a flowchart of a method of maintaining a global repository of parental control information, according to one embodiment of the present invention.

The method begins at 310, with maintenance of a global repository of parental control information, as discussed further with regard to FIG. 4. The global repository includes parental control profiles and information related to the parental control profiles. The global repository can be used to improve parental control system usability. In an embodiment, the parental control module groups restrictions in the policy information according to characteristics of users to which the restrictions have been applied. For example, the parental control module can detect that a particular restriction is commonly applied to users having a particular characteristic, e.g., users between a particular age range, or located in a particular geographic region. The given restriction can be added to a subset of restrictions that are commonly applied to the particular subset of users. The parental control module groups the restrictions into subsets based on an attribute value or range of attribute values to improve speed and accuracy of selecting effective restrictions for a parental control policy for a given client. It will be appreciated, in light of the present disclosure, that the operations regarding a global repository's maintenance are shown at a single point in the processing performed in relation to a parental control policy. It will be further appreciated that the maintenance of such a repository is, in fact, an ongoing process, and is typically performed before, during, and after the supplying and application of such parental control policies.

Figure 5:
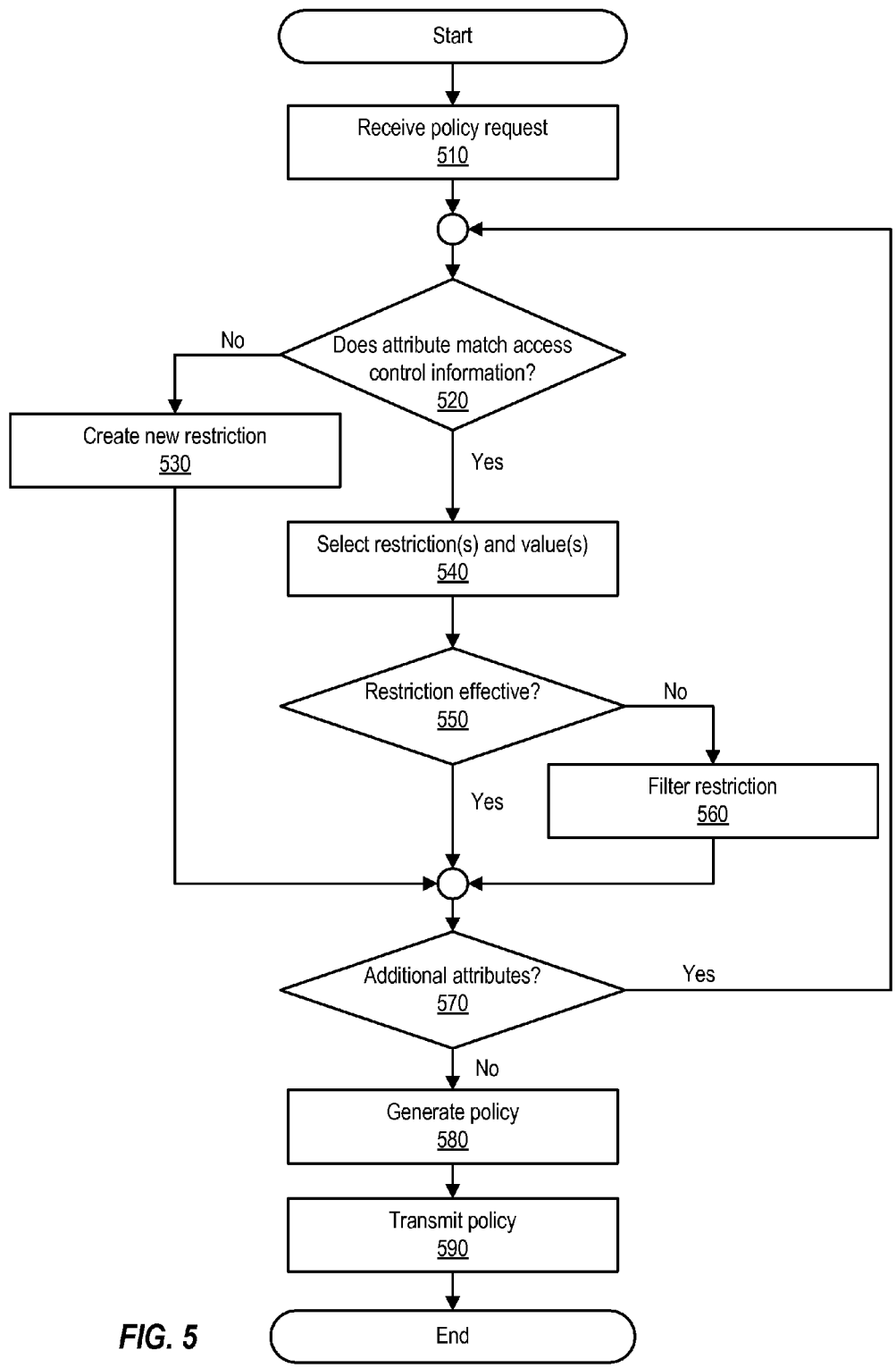
FIG. 5 is a flowchart of a method of supplying a parental control policy, according to one embodiment of the present invention.

At 320, the parental control module supplies a parental control policy, e.g. to the parental control client, as discussed further with regard to FIG. 5. A user is provided with a parental control policy configured for the user, based on information provided by the user. Configuring a parental control policy involves creating a list of activities that are subject to restriction, e.g., viewing a certain web site. For each restricted activity, one or more values indicating the type of restriction is specified. For example, the restriction can specify that absolutely no access is permitted by any user, may specify that one user is permitted unrestricted access while another is completely prohibited, or may specify limited access to a user. Limited access can involve providing access during a certain time period, or with approval from another user. Full, limited, or completely restricted are several example values. Configuring a parental control policy involves establishing one or more values for each restriction that define how the restriction affects activities on the client. Predefined values can be presented in a menu, e.g., a drop-down list, for selection. Alternatively, custom values can be entered. In an embodiment, values are automatically selected by a policy generator module, such as policy generator module 125 of FIG. 1. It will be further appreciated that once automatically configured, such parameters can then be modified by a user. Such manual modification involves the parental control client detecting that the user has permission to modify the parental control policy.

Figure 6:
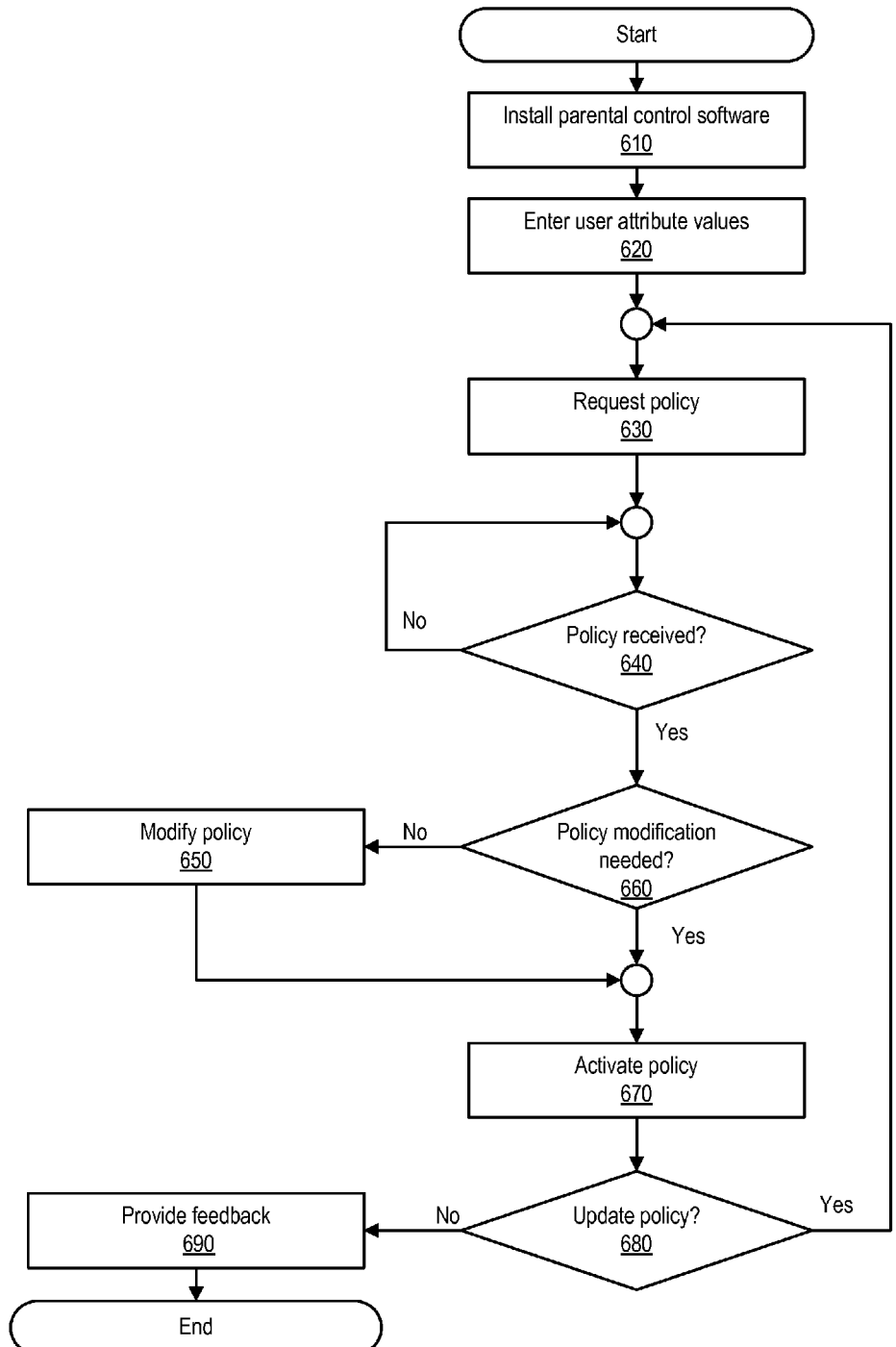
FIG. 6 is a flowchart of a method of applying a parental control policy, according to one embodiment of the present invention.

At 330, the parental control client applies the parental control policy, as discussed further with regard to FIG. 6. In response to detecting that a user has logged in to the client, the parental control client uses the login credentials to identify restrictions that apply to the user. The parental control policy prevents the user from using the client to perform unauthorized activity.

FIG. 4 is a flowchart of a method of maintaining a global repository of parental control information. The method can be implemented by a computing device implementing a parental control module, such as computing device 110 of FIG. 1, which implements parental control module 120. In some embodiments, the computing device is coupled to a repository comprising policy information, such as repository 142 of FIG. 1 with access control information 145, and a client implementing a parental control client, such as client 150 of FIG. 1 which implements parental control client 155.

At 410, the parental control module receives policy information. The received policy information can be received from a parental control client. The parental control client can automatically send the policy information to the parental control module on a periodic basis. Alternatively, the parental control client can send the policy information in response to detecting a change at the client, or in response to a query from the parental control module.

In an embodiment, the policy information can also be received by one or more other sources in addition to or instead of from the parental control client. For example, policy information can be received from a source that rates Internet activities and/or content for safety or appropriateness. The parental control module can use this information to select restrictions, parameters, and values to be included in a parental control policy.

The received policy information can include a request for a new policy, a request to modify an existing policy, and/or feedback on an existing policy. At 420, the parental control module detects whether the received policy information relates to an existing policy or not. If the received policy information is related to an existing policy, the received policy information can include an indication that an existing policy has been activated or deactivated. The received policy information can also include information indicating the effectiveness of one or more restrictions in the existing parental control policy or effectiveness of the existing parental control policy as a whole.

The parental control module calculates the effectiveness of the existing parental control policy, at 430. This can involve the parental control module calculating a number of successful preventions for each restriction and comparing the number to a number of unsuccessful preventions for each restriction. The parental control module can calculate an effectiveness rating for the parental control policy as a whole based upon a combination of the individual measures of effectiveness for each restriction. The parental control module can also calculate reputation information, at 445, for the creator or author of the existing parental control policy.

In an embodiment, if the received policy information is not related to an existing policy, the received policy information includes a request by the parental control client for the policy generator to generate a new parental control policy. At 440, the parental control module parses the received policy information for user attributes. The parental control module uses the user attributes to identify parental control policies for similar users as the user(s) whose attributes are included in the received policy information. The parental control module parses restrictions from the received policy information at 450. The received policy information can include particular restrictions that are to be included in the new parental control policy. The restrictions included in the information can supersede or be added to restrictions generated by the parental control module based on user attributes received in the received policy information.

At 460, the parental control module detects whether the received information, e.g., user attributes or usage restrictions, matches an existing group within the access control information. The parental control module can organize the access control information into groups. For example, the parental control module can detect that a set of restrictions is effective for users of a certain age range, gender, geographic location, or other attribute. Based this detection, the parental control module can group the restrictions into a set. When the parental control module receives a request for a policy, the policy generator can detect which range of values a given attribute falls into. For example, the policy generator can detect that an age value for a user of the requested parental control policy is within a first range, such as 5-9 years old. Based on this detection, the parental control module select a set of restrictions that are effective for users in that age range.

If the access control information does not include any groupings for a given attribute, the parental control module creates a new group at 470. For example, if a request for a parental control policy indicates that a user is located in a specific geographic region, and there is no group, or set, of restrictions for that geographic region, the parental control module can create a new group for that geographic region. If the parental control module receives additional requests for parental control policies for users in that geographic region, the policy generator can select the group of restrictions and parameter values that the parental control module previously created. This allows the policy generator to more efficiently generate more effective parental control policies.

At 480, the parental control module updates the policy information in the repository. This can involve storing (either locally or in the repository) new groupings of restrictions, new attribute information for users for which policies have been created, and new parental control policies. In an embodiment this involves storing (either locally or in the repository) feedback related to existing parental control policies, such as information indicating the effectiveness of the parental control policies.

FIG. 5 is a flowchart of a method of supplying a parental control policy, according to one embodiment of the present invention. The method can be implemented by a parental control module, such as parental control module 120 of FIG. 1.

The parental control module receives a request for a parental control policy from a parental control client, such as parental control client 155 of FIG. 1, at 510. At 520, the parental control module detects whether the user attribute values match user attribute values associated with one or more policies stored in policy information, such as access control information 145 of FIG. 1. If the parental control module detects that the user attributes received in the policy request do not match attributes for parental control policy restrictions stored in the access control information, the parental control module creates a new restriction based on the user attributes at 530.

Otherwise, at 540, the parental control module selects one or more restrictions and values for the restrictions selected. For example, the policy request can specify values for a user's age, location, and gender. By comparing the specified values with those stored in the policy information, the parental control module can select parental control policies, or individual restrictions, that have been generated for other users having similar age, location, and gender values. The parental control module can calculate a formula that gives a relative weight, or importance, to the various user attribute values. For example, in selecting matching restriction values, the parental control module may give more weight to matching age than to matching gender. Based on the comparison, the parental control module calculates a correlation value indicating how good a match a given restriction is. The parental control module selects restrictions and values that have a high correlation score to be included in the requested parental control policy.

The parental control module can detect, at 550, whether a selected restriction is effective. The parental control module can determine the effectiveness of a restriction based on information stored in the access control information. At 560, the parental control module filters selected restrictions based on the effectiveness of the restrictions. That is, the parental control module discards, or removes from consideration for the parental control policy being generated, restrictions that do not meet a pre-specified effectiveness threshold. The access control information can store effectiveness information for each restriction or for parental control policies as a whole. The effectiveness information can include an effectiveness rating based on the measured effectiveness of the restriction. Alternatively, the effectiveness rating of a parental control policy can be associated with a reputation value for a user associated with the parental control policy. For example, the parental control module can determine that parental control policies created by a specific user are relatively ineffective. This determination can be made by examining the effectiveness of parental control policies created by the specific user. Based upon this determination, the parental control module can assign the specific user a relatively low, or poor, reputation value, and assign the reputation value to parental control policies created by the specific user. If there are additional attributes included with the request to generate a parental control policy, the process returns to 520.

Otherwise, once the parental control module has selected and, optionally, filtered the restrictions and values, the parental control module aggregates the restrictions and values into a parental control policy at 580. Rather than selecting individual restrictions and compiling a parental control policy, the parental control module can select a parental control policy as a whole from the policy information, based on comparing user attributes of the selected parental control policy with user attributes received in the request for a parental control policy received from the parental control client. The parental control module then transmits the parental control policy to the parental control client that requested the value, at 590.

FIG. 6 is a flowchart of a method of applying a parental control policy. The method can be implemented by a parental control client, such as parental control client 155 of FIG. 1. At 610, the parental control client is loaded on a client, e.g., client 150 of FIG. 1. The parental control client can be loaded automatically or manually by a user of the client. At 620, the user enters one or more user attribute values. For example, the user can access a graphical user interface for the parental control client and specify an age, gender, geographic location, and/or other characteristics for one or more users of the client. Optionally, the user can specify one or more restrictions. For example, the user can specify that all Internet chat rooms are prohibited.

The parental control client, at 630, sends a request to a parental control module, such as parental control module 120 of FIG. 1, specifying that a parental control policy should be generated and supplied to the parental control client. The request can include the user attribute values and the one or more restrictions. In an embodiment, this step is skipped as the parental control module detects that the parental control client should receive a parental control policy and automatically transmits a parental control policy to the parental control client. At 640, the parental control client detects whether a parental control policy has been received. If not, the process waits until the parental control client receives a parental control policy.

At 660, the parental control client detects whether the parental control policy received from the parental control module is complete. That is, the parental control client detects whether specified restrictions are included in the parental control policy and whether values are included for the restrictions. Alternatively, or in addition, the user can be given the opportunity to modify restrictions at this juncture, if the user so desires. If additional values and/or restrictions are needed or desired, the parental control client modifies, or allows the user to modify, the parental control policy at 650. For example, the parental control client can modify one or more restriction values and/or one or more user attribute values.

After receiving the parental control policy, the parental control client activates the parental control policy at 670.

Once the parental control policy is activated, activities performed using the client are subject to the restrictions of the parental control policy. At 680, the parental control client detects whether the parental control policy should be updated, e.g., in response to detecting changes regarding the users, such as a child growing older, or moving from one geographic or jurisdictional area to another. If the parental control policy should be updated, the process returns to 630.

Otherwise, at 690, the parental control client provides feedback about the parental control policy to the parental control module. This can involve monitoring the effectiveness of the parental control policy. Providing feedback can also involve detecting changes in user attribute values. Feedback can also include information on effectiveness of one or more restrictions included in the parental control policy. The parental control client can generate a message including the feedback and transmit the message to the parental control module. Generating the message can be performed automatically, e.g., on a periodic basis, or can be initiated manually, e.g., by a user of the parental control client.

Figure 7:
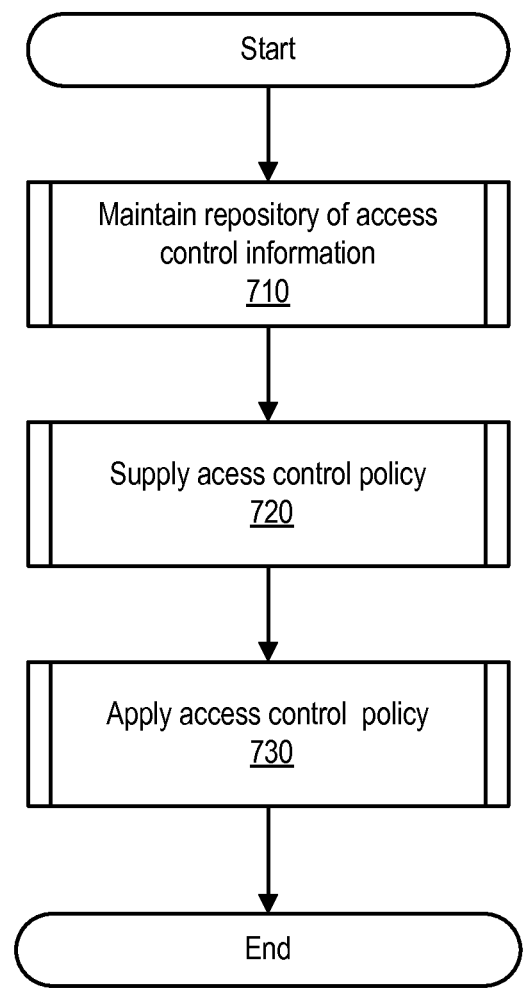
FIG. 7 is a flowchart of a method of operating of an access control system, according to one embodiment of the present invention.

FIG. 7 is a flowchart of a method of operating of an access control system. The access control system can be implemented to control access to computer resources in a business environment, such as an office. A business environment can involve multiple computer systems utilized by multiple employees. The access control requirements for the various systems and users can vary. The method can be implemented by a computing device implementing a parental control module, such as computing device 110 of FIG. 1, which implements parental control module 120. In some embodiments, the computing device is coupled to a repository comprising policy information, such as repository 142 of FIG. 1 with access control information 145, and a client implementing a parental control client, such as client 150 of FIG. 1 which implements parental control client 155. An access control system can use the same or similar restrictions as those described with regard to a parental control system intended for private use, e.g., to limit children's access to the Internet. However, an access control policy for business use is likely to use additional criteria, such as preventing access to news sites, sales sites, and other sites of interest to adults. For example, an access control policy implemented for employees of a computer company could prevent the users from surfing competitors' sites.

The method begins at 710, with maintenance of a repository of access control information. The repository includes access control profiles and information related to the access control profiles. The repository can be used to improve access control system usability. In an embodiment, the parental control module groups restrictions in the access control information according to characteristics of users to which the restrictions have been applied. For example, the parental control module can detect that a particular restriction is commonly applied to users having a particular characteristic, e.g., employees of a particular department, or located in a particular office. The given restriction can be added to a subset of restrictions that are commonly applied to the particular subset of users. The parental control module groups the restrictions into subsets based on an attribute value or range of attribute values to improve speed and accuracy of selecting effective restrictions for a parental control policy for a given client.

At 720, the parental control module supplies a parental control policy, e.g. to the parental control client. A user is provided with an access control policy configured for the user, based on information provided by the user. Configuring an access control policy involves creating a list of activities that are subject to restriction, e.g., viewing a certain web site. For each restricted activity, one or more values indicating the type of restriction is specified. For example, the restriction can specify that absolutely no access is permitted by any user, may specify that one user is permitted unrestricted access while another is completely prohibited, or may specify limited access to a user. Limited access can involve providing access during a certain time period, or with approval from another user. Full, limited, or completely restricted are several example values. Configuring an access control policy involves establishing one or more values for each restriction that define how the restriction affects activities on the client. Predefined values can be presented in menu, e.g., a drop-down list, for selection. Alternatively, custom values can be entered. In an embodiment, values are automatically selected by a policy generator module, such as policy generator module 125 of FIG. 1. It will be further appreciated that once automatically configured, such parameters can then be modified by a user. Such manual modification involves the parental control client detecting that the user has permission to modify the parental control policy.

At 730, the parental control client applies the access control policy. In response to detecting that a user has logged in to the client, the parental control client uses the login credentials to identify restrictions that apply to the user. The access control policy prevents the user from using the client to perform unauthorized activity. The parental control client can modify the access control policy in response to changes in user attributes. For example, the parental control client can reduce or modify restrictions for a user in response to detecting that the user has changed job titles or locations.

Figure 8:
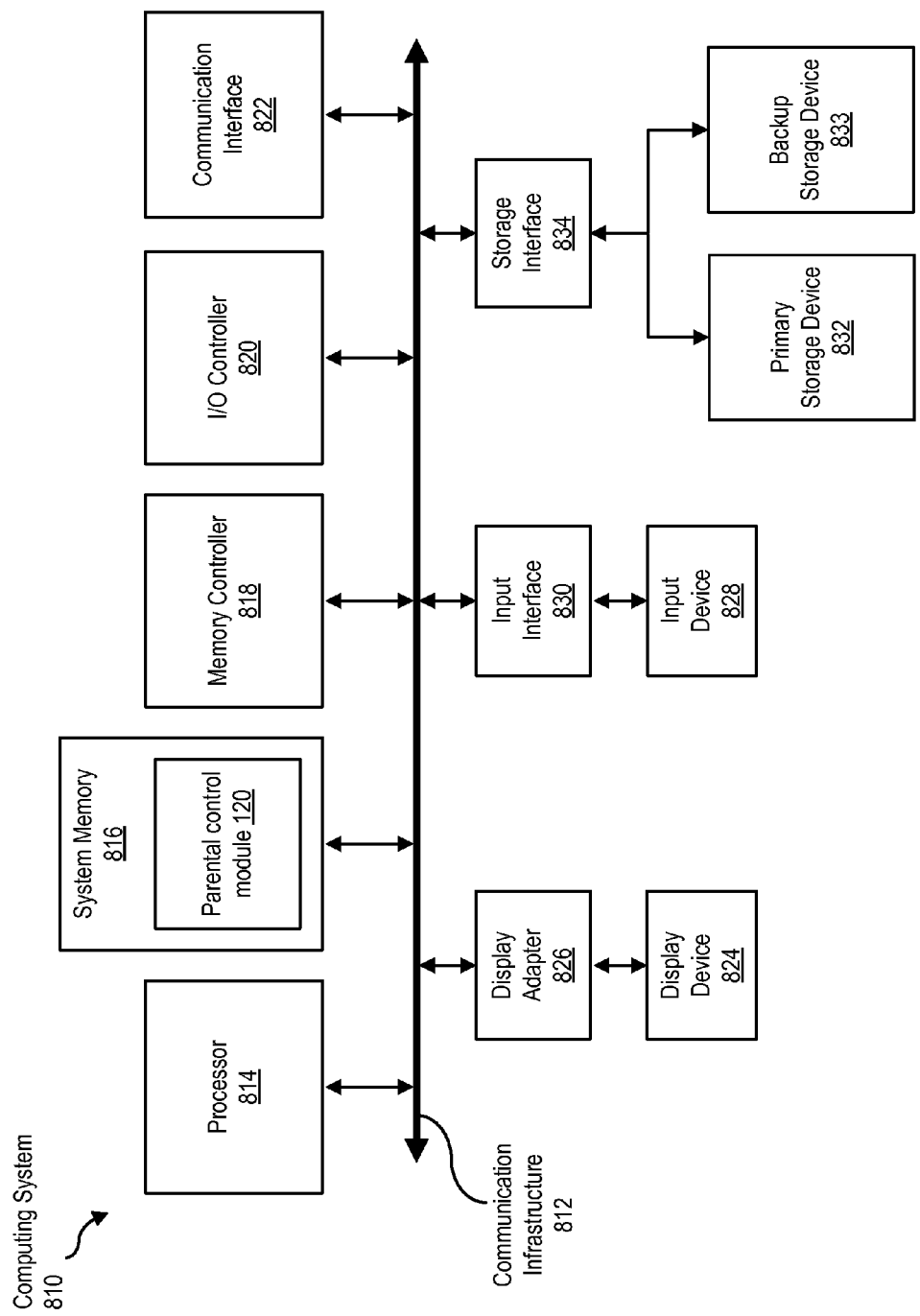
FIG. 8 is a simplified block diagram of a computing system capable of implementing embodiments of the present invention.

FIG. 8 is a simplified block diagram of a computing system 810 capable of implementing a parental control policy generation as described above. Computing system 810 broadly represents any single or multi-processor computing device or system capable of executing computer-readable instructions. Examples of computing system 810 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 810 may include at least one processor 814 and a system memory 816. By executing the software that implements a parental control module 120, computing system 810 becomes a special purpose computing device that is configured to parental control policy generation.

Processor 814 generally represents any type or form of processing unit capable of processing data or interpreting and executing instructions. In certain embodiments, processor 814 may receive instructions from a software application or module. These instructions may cause processor 814 to perform the functions of one or more of the embodiments described and/or illustrated herein. For example, processor 814 may perform and/or be a means for performing the operations described herein. Processor 814 may also perform and/or be a means for performing any other operations, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, program instructions executable to implement a parental control module 120 (e.g., as shown in FIG. 1) may be loaded into system memory 816.

In certain embodiments, computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the operations or features described and/or illustrated herein.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1694 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, computing system 810 may also include at least one input device 828 coupled to communication infrastructure 812 via an input interface 830. Input device 828 generally represents any type or form of input device capable of providing input, either computer or human generated, to computing system 810. Examples of input device 828 include, without limitation, a keyboard, a pointing device, a speech recognition device, or any other input device.

As illustrated in FIG. 8, computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. A storage device like primary storage device 832 can store information such parental control policies and information related to parental control policies.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8.

Computing system 810 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 810 for storage in memory via a network such as the Internet or upon a carrier medium.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the embodiments described and/or illustrated herein. Additionally or alternatively, one or more of the embodiments described and/or illustrated herein may be implemented in firmware and/or hardware. For example, computing system 810 may be configured as an application specific integrated circuit (ASIC) adapted to implement one or more of the embodiments disclosed herein.

Figure 9:
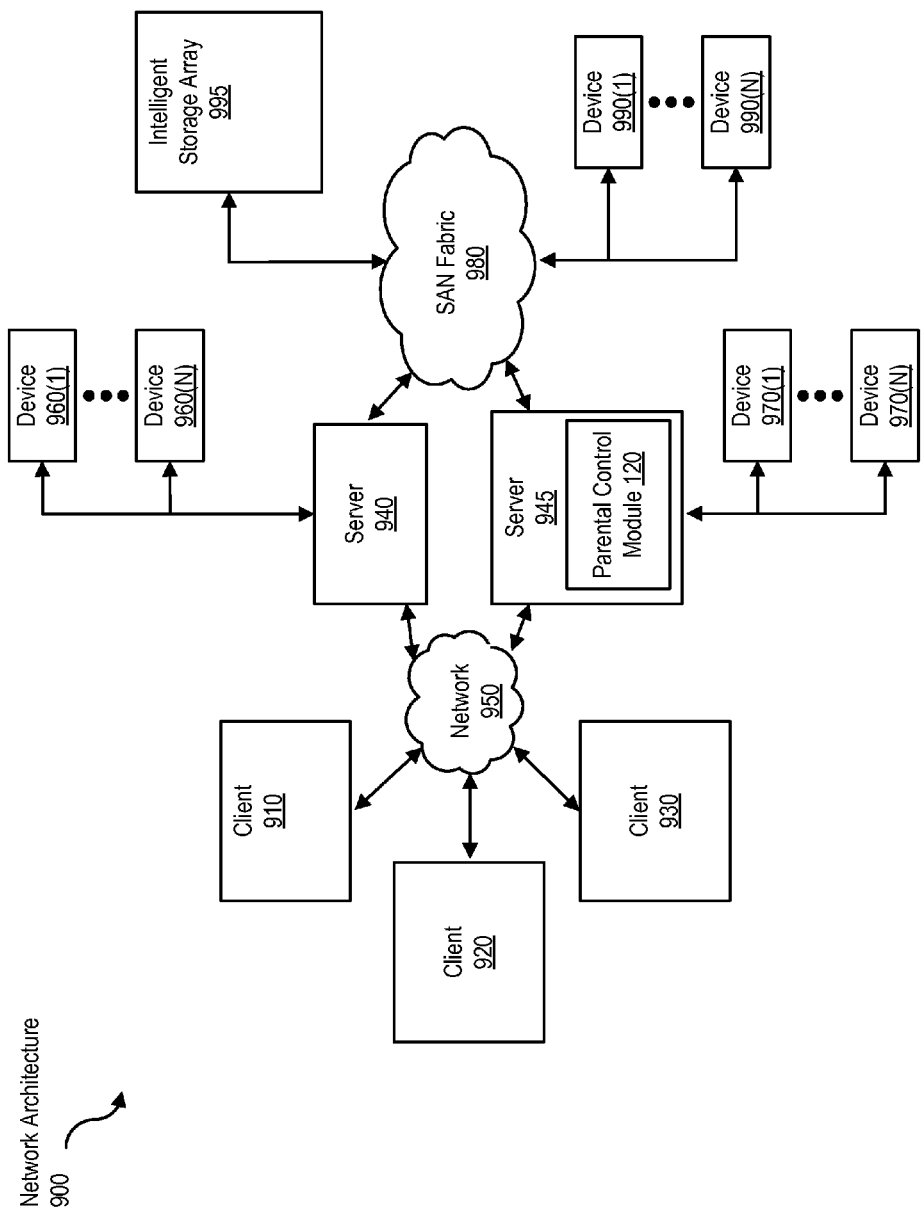
FIG. 9 is a simplified block diagram of a network architecture 700 in which embodiments of the present invention may be implemented.

FIG. 9 is a block diagram of a network architecture 700 in which client systems 910, 920, and 930 and servers 940 and 945 may be coupled to a network 950. Client systems 910, 920, and 930 generally represent any type or form of computing device or system, such as computing system 810 in FIG. 8.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, one or more of client systems 910, 920, and/or 930 may include a parental control module 120 as shown in FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as Network File System (NFS), Server Message Block (SMB), or Common Internet File System (CIFS). Such storage devices can store deduplication signatures, backup images and/or backup catalogs, as described above.

Servers 940 and 945 may also be connected to a storage area network (SAN) fabric 980. SAN fabric 980 generally represents any type or form of computer network or architecture capable of facilitating communication between multiple storage devices. SAN fabric 980 may facilitate communication between servers 940 and 945 and a plurality of storage devices 990(1)-(N) or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein may also be encoded as a computer program, stored in server 940, run by server 945, and distributed to client systems 910, 920, and 930 over network 950.

In some examples, all or a portion of one of the systems in FIGS. 1, 8, and 9 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a placement module may transform the behavior of a placement server such that a physical machine's performance is less negatively impacted due to implementing additional virtual machines on the physical machine.

Those skilled in the art will readily implement the steps necessary to provide the structures and the methods disclosed herein, and will understand that the process parameters and sequence of steps are given by way of example only and can be varied to achieve the desired structures and methods as well as modifications that are within the scope of the invention. Variations and modifications of the embodiments disclosed herein can be made based on the description set forth herein, without departing from the scope of the invention. Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving attribute information, wherein the attribute information identifies an attribute of a computer user, and the attribute information is received from a parental control client;

comparing the attribute information with access control information, wherein the access control information comprises a plurality of existing access control policies, and the existing access control policies are stored in a repository of access control information;

selecting a value for an access restriction of a set of access restrictions, wherein the access restriction indicates accessibility of a resource, and the selecting comprises identifying a first access control policy of the plurality of existing access control policies; and generating an access control policy, wherein the access control policy comprises the value of the access restriction.

2. The method of claim 1, further comprising:

defining the set of access restrictions, based on the attribute information.

3. The method of claim 2, further comprising:

setting a respective value of each access restriction of the set of access restrictions.

4. The method of claim 1, further comprising:

determining that a first value of a set of values for the access restriction is ineffective; and filtering the first value out of the set of values for the access restriction.

5. The method of claim 1, further comprising:

grouping the access control information based upon attributes of the access control information.

6. The method of claim 1, wherein the attribute information comprises at least one of age, gender, or location, the attribute information is received at a policy generation module implemented by a first computing device, and the parental control client is implemented by a second computing device.

7. The method of claim 1, further comprising:

evaluating an effectiveness of a parental control policy, wherein the access control information comprises the parental control policy; and generating a reputation value for a creator of the access control policy, based on the evaluating.

8. The method of claim 1, further comprising:

receiving feedback indicating an effectiveness of an access policy.

9. The method of claim 1, further comprising:

detecting that the access control policy should be modified; and modifying the access control policy.

10. A non-transitory computer readable storage medium storing program instructions executable to:

receive attribute information, wherein the attribute information identifies an attribute of a computer user, and the attribute information is received from a parental control client;

compare the attribute information with access control information, wherein the access control information comprises a plurality of existing access control policies, and the existing access control policies are stored in a repository of access control information;

select a value for an access restriction of a set of access restrictions, wherein the access restriction indicates accessibility of a resource, and selecting the value comprises identifying a first access control policy of the plurality of existing access control policies; and generate an access control policy, wherein the access control policy comprises the value of the access restriction.

11. The non-transitory computer readable storage medium of claim 10, wherein the instructions are further executable to:

define the set of access restrictions, based on the attribute information.

12. The non-transitory computer readable storage medium of claim 10, wherein the instructions are further executable to:

determine that a first value of a set of values for the access restriction is ineffective; and filter the first value out of the set of values for the access restriction.

13. The non-transitory computer readable storage medium of claim 10, wherein the instructions are further executable to:

group the access control information based upon attributes of the access control information.

14. The non-transitory computer readable storage medium of claim 10, wherein the instructions are further executable to:

evaluate an effectiveness of a parental control policy, wherein the access control information comprises the parental control policy; and generate a reputation value for a creator of the access control policy, based on the evaluating.

15. The non-transitory computer readable storage medium of claim 10, wherein the instructions are further executable to:

detect that the access control policy should be modified; and modify the access control policy.

16. A system comprising:

one or more processors; and a memory coupled to the one or more processors, wherein the memory stores program instructions executable by the one or more processors to:

receive attribute information, wherein the attribute information identifies an attribute of a computer user, and the attribute information is received from a parental control client;

compare the attribute information with access control information, wherein the access control information comprises a plurality of existing access control policies, and the existing access control policies are stored in a repository of access control information;

select a value for an access restriction of a set of access restrictions, wherein the access restriction indicates accessibility of a resource, and selecting the value comprises identifying a first access control policy of the plurality of existing access control policies; and generate an access control policy, wherein
the access control policy comprises the value of the access restriction.

17. The system of claim 16, wherein the instructions are further executable to:
define the set of access restrictions, based on the attribute information.

18. The system of claim 16, wherein the instructions are further executable to:
determine that a first value of a set of values for the access restriction is ineffective; and
filter the first value out of the set of values for the access restriction.

19. The system of claim 16, wherein the instructions are further executable to:
evaluate an effectiveness of a parental control policy, wherein
the access control information comprises the parental control policy; and
generate a reputation value for a creator of the access control policy, based on the evaluating.

20. The system of claim 16, wherein the instructions are further executable to:
detect that the access control policy should be modified; and
modify the access control policy.

* * * * *